United States Patent
Benantar et al.

(10) Patent No.: US 10,382,563 B2
(45) Date of Patent: Aug. 13, 2019

(54) ESTABLISHING CROSS-VENDOR SECURE CONNECTIVITY IN A SHARED COMPUTING ENVIRONMENT

(71) Applicant: International Business Machines Corporation, Armonk, NY (US)

(72) Inventors: Messaoud Benantar, Austin, TX (US); David Y. Chang, Austin, TX (US); John Y. Chang, Austin, TX (US); Vishwanath Venkataramappa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 15/448,114

(22) Filed: Mar. 2, 2017

(65) Prior Publication Data
US 2018/0255142 A1 Sep. 6, 2018

(51) Int. Cl.
*H04L 29/08* (2006.01)
*H04L 12/24* (2006.01)
(Continued)

(52) U.S. Cl.
CPC ........ *H04L 67/141* (2013.01); *H04L 41/0806* (2013.01); *H04L 63/0272* (2013.01);
(Continued)

(58) Field of Classification Search
CPC ... H04L 67/10; H04L 67/141; H04L 67/2809; H04L 67/2823; H04L 63/08; H04L 63/10;
(Continued)

(56) References Cited

U.S. PATENT DOCUMENTS

| 7,987,455 B1 * | 7/2011 | Senner | G06F 9/45512 715/700 |
| 8,452,881 B2 | 5/2013 | Boubez et al. | |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Ruolei Zong
(74) *Attorney, Agent, or Firm* — Heslin Rothenberg Farley & Mesiti P.C.

(57) ABSTRACT

A method, computer program product, and a device for establishing a direct communications connection between gateways of two computing systems includes a processor(s) of a first system receiving configuration instructions in a generic format and translating the configuration instructions into a first set of gateway configuration commands that are in a format compatible with a first gateway of the first system. The processor(s) executes the first set to configure the first gateway. The processor(s) transmits, via a communication protocol, the configuration instructions, to a program(s) of a second computing systems, the program(s) translates the configuration instructions into a second set of gateway configuration commands, in a format compatible with the second gateway, and executes the second set to configure the second gateway. The processor(s) establishes a direct communications connection between the first gateway and the second gateway, based on the configurations matching.

20 Claims, 7 Drawing Sheets

(51) Int. Cl.
*H04L 12/66* (2006.01)
*H04L 29/06* (2006.01)

(52) U.S. Cl.
CPC .............. *H04L 63/08* (2013.01); *H04L 67/10* (2013.01); *H04L 67/2809* (2013.01); *H04L 67/2823* (2013.01); H04L 41/5003 (2013.01); H04L 63/166 (2013.01)

(58) Field of Classification Search
CPC ... H04L 63/0272; H04L 63/166; H04L 41/08; H04L 41/0806; H04L 41/5003; H04L 41/5096
USPC ........................................................ 709/222
See application file for complete search history.

(56) References Cited

U.S. PATENT DOCUMENTS

| | | | |
|---|---|---|---|
| 8,549,300 B1 | 10/2013 | Kumar et al. | |
| 9,203,784 B2 | 12/2015 | Chang et al. | |
| 9,813,379 B1* | 11/2017 | Shevade | H04L 63/0272 |
| 2009/0158416 A1* | 6/2009 | Statia | H04L 63/0281 726/12 |
| 2013/0159447 A1* | 6/2013 | Wei | H04L 41/0886 709/208 |
| 2016/0352682 A1* | 12/2016 | Chang | H04L 61/6022 |

* cited by examiner

ESTABLISHING CROSS-VENDOR SECURE CONNECTIVITY IN A SHARED COMPUTING ENVIRONMENT

BACKGROUND

Public clouds are distributed computing systems where the cloud infrastructure is made available to the general public or a large industry group and the distributed computing system is typically owned by an organization selling cloud services. Public clouds allow users to share resources and applications in accordance with the scale of the use of each user. Because a public cloud typically serves many independent user entities, public cloud is a multi-tenant environment. Typically, in a public cloud, a single architecture hosts multiple customers' applications and data. A public cloud is one type of public computer system. Public computer systems directly solicit usage from at least a substantial portion of the general public (for example, this type of computer system may directly solicit usage by anybody in a large industry group that includes many companies and individuals). Typically, a public computer system user must authenticate in some manner before a session that uses computing resources of the public computer system.

A private cloud differs from a public cloud. A private cloud is a term for a cloud infrastructure that is operated primarily to serve the computing needs of a single entity (for example, an individual, a company, a charitable organization). Resources utilized in a private cloud can be deployed internally. As such, rather than running web-based and rich client applications over the Internet, a private cloud can employ cloud computing within a company's own local or wide area networks. When the resources of a private cloud are located localized in this manner, the private cloud can be referred to as a local cloud. The term implies that the same virtualization and highly flexible and scalable methods used in huge Internet-based datacenters are also used in the private clouds in the enterprise. A cloud which is local and/or private is herein referred is one type of private computer system. Private computer systems do not directly solicit usage by any substantial segment of the public. Typically, a private computer system must authenticate a user in some manner before initiating a session that uses computing resources of the private computer system.

Establishing connectivity between private computer systems (e.g., private cloud computing systems) and public computing systems (e.g., public cloud computing systems) can be advantageous for reasons such as resource sharing, but can present many technical challenges. In fact, the complexities of connecting these systems can be so overwhelming that connectivity can take days to achieve. Various methods utilized to establish connections between these two computer systems include, but are not limited to: 1) OpenVPN, an open-source software application that implements virtual private network (VPN) techniques for creating secure point-to-point or site-to-site connections in routed or bridged configurations and remote access facilities using a custom security protocol; 2) IPSec VPN, using the Internet Protocol Security (IPsec) set of protocols, which sit on top of the Internet Protocol (IP) layer, to allow the two systems to communicate in a secure manner by authenticating and encrypting each IP packet of a communication session over a VPN; 3) a direct connection over the Internet, couples with additional firewall rules on each side of the network; and/or 4) a leased line connection between the two physical sites that house the computer systems. However, these and other methods of connecting a private computer system to a public computer system are technically complex because they require the use of a VPN, at least one firewall, network address translation (NAT), and programs that configure routing configurations on gateways to both systems (e.g., the private cloud gateway and the public cloud gateway).

Because the gateway equipment on each side of a hybrid connection between a public and private computing system can be provided by different vendors, there is no single configuration protocol that can be reliably utilized across both systems. Instead, engineers working on both systems must coordinate to complete an initial configuration, as well as to make any adjustments necessitated by changes to either system. For example, engineers working at the private cloud and the public systems exchange security information, such as certificates, shared-keys, and other configuration parameters, because the measures must match on both the sides for the connection to succeed. The engineers must also coordinate with each other to troubleshoot VPN and firewall issues, expanding the timeline for setting up a routing configuration. Finally, the engineers on either side must coordinate when making any incremental change to the configuration of either system, such as opening a new port or adding a new element, because a change in one system can require changes to firewall configurations and VPN configurations in both systems.

SUMMARY

Shortcomings of the prior art are overcome and additional advantages are provided through the provision of a method for establishing a direct communications connection between gateways of two computing systems. The method includes: receiving, by one or more processors of a first computing system, configuration instructions in a generic format; translating, by the one or more processors, the configuration instructions into a first set of gateway configuration commands, wherein the first set of gateway configuration commands is in a format compatible with a first gateway of the first computing system; executing, by the one or more processors, the first set of gateway configuration commands, to configure the first gateway in accordance with the configuration instructions; transmitting, by the one or more processors, via a communication protocol, the configuration instructions, to one or more programs of a second computing systems, wherein based on receiving the configuration instructions, the one or more programs translate the configuration instructions into a second set of gateway configuration commands, wherein the second set of gateway configuration commands is in a format compatible with the second gateway, and execute the second set of gateway configuration commands to configure the second gateway in accordance with the configuration instructions; and establishing, by the one or more processors, a direct communications connection between the first gateway and the second gateway, based on a configuration of the first gateway matching a configuration of the second gateway.

Methods, computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
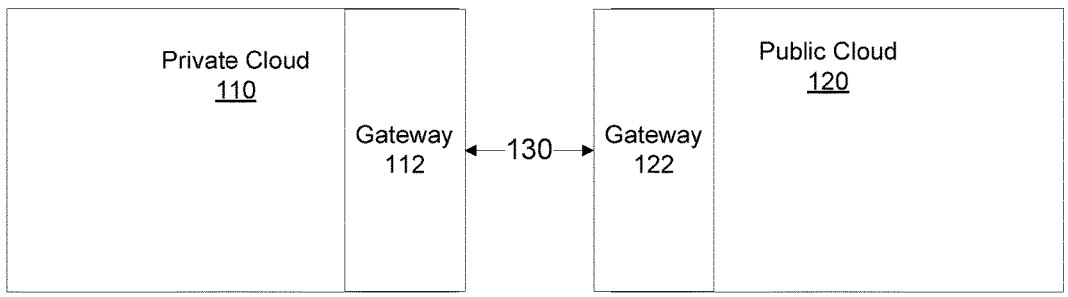
FIG. 1 is a break out view depicting certain aspects of a display device of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
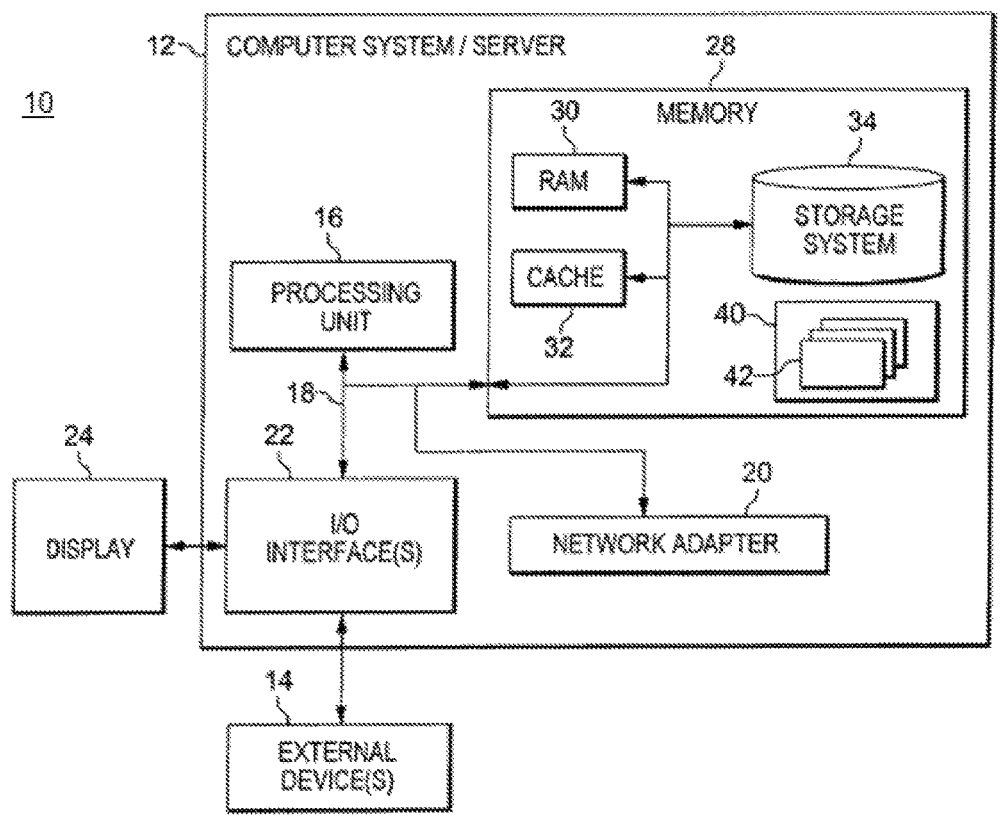
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

In contrast to the complex and time-intensive existing methods described above, embodiments of the present invention provide a more efficient and centralized method of establishing a communications connection in a hybrid computing environment, for example, between two shared computing systems (e.g., cloud computing systems), from different providers (e.g., vendors). The two systems may include a public shared computing system (e.g., a public cloud), and a private shared computing system (e.g., a private cloud). Embodiments of the present invention simplify both configuration and troubleshooting related to communications between the two differing systems by centralizing various controls. Aspects of the present invention can be implemented in computing environments regardless of whether the third party gateways are compatible or are provided by different vendors. In an embodiment of the present invention, a program executing on at least one processing circuit enables a single administrator: 1) to access gateway settings of two different shared computing environments from a single location; 2) to configure the gateways from this location; and 3) to troubleshoot the gateways from this location. In an embodiment of the present invention, the program configures and troubleshoots network elements with a syntax and method that is independent of the gateways and therefore, compatible with both computer systems.

Some embodiments of the present invention may include one, or more, of the following features, characteristics, advantages and/or operations: (i) a computer program product for use with a gateway computer made by a first gateway vendor or a second gateway vendor, with the gateway computer controlling data communications between cloud computing resources in a first cloud and computing resources external to the first cloud; (ii) computer instructions programmed to receive connectivity configuration instructions according to a generic syntax and translate the instructions into a first syntax that is characteristic of gateways made by the first gateway vendor; (iii) computer instructions programmed to receive connectivity configuration instructions according to the generic syntax and translate the instructions into a second syntax that is characteristic of gateways made by the second gateway vendor; (iv) the connectivity configuration instructions include instructions relating to the following: (a) type of connectivity for connecting, in data communication, cloud computing resources of the first cloud and computing resources external to the first cloud, (b) authentication related information for connecting, in data communication, cloud computing resources of the first cloud and computing resources external to the first cloud, (c) connection parameters for connecting, in data communication, cloud computing resources of the first cloud and computing resources external to the first cloud, (d) Internet Protocol (IP) related information of the first cloud and/or the computing resources external to the first cloud, and (e) subnet related information of the first cloud and/or the computing resources external to the first cloud; (v) the connectivity configuration instructions include instructions relating to the following: (a) firewall configuration information for connecting, in data communication, cloud computing resources of the first cloud and computing resources external to the first cloud, (b) routing related information for connecting, in data communication, cloud computing resources of the first cloud and computing resources external to the first cloud, (c) NAT related information for connecting, in data communication, cloud computing resources of the first cloud and computing resources external to the first cloud, and (d) VPN related information for connecting, in data communication, cloud computing resources of the first cloud and computing resources external to the first cloud; (vi) computer instructions programmed to establish a tunnel for heterogeneous interaction between two or more gateways from different vendors; (vii) computer instructions programmed to establish a two way tunnel for direct data communication between two or more gateways from different vendors; (viii) any agent that can handle multiple syntaxes for configuring cloud gateways; (ix) universal coverage of all syntaxes in the world; (x) providing generic way to configure various types of VPN, firewall, NAT on different vendor gateways and therefore supports multiple VPN protocols and also assists in managing and configuring multiple vendor gateways; and/or (xi) gateways that are multi-vendor in a hybrid cloud environment and is about establishing connection between multi-vendor gateways and configuring multi-vendor gateways.

In an embodiment of the present invention, a program configures both sides of a hybrid computer system connection by establishing a new protocol layer on top of the existing connectivity protocol. As an added advantage, the program can utilize this new layer to make both connectivity-related and non-connectivity related changes on the gateways on either side of the connection. Aspects of embodiments of the present invention represent improvements to computing technology because they provide an improved solution for establishing a communications connection in a hybrid computing environment. The advantages provided by various aspects of embodiments of the present invention are inextricably tied to computing at least because these aspects improve communications between different computer systems by providing a syntax and vendor-independent method of centrally coordinating the configuration of a communication connection and the troubleshooting of this connection, between these different systems.

Certain embodiments of the present invention provide various advantages over existing technologies used to connect two computing systems, such as a private cloud and a public cloud. For example, some existing methods only form a one way tunnel between systems, while embodiments of the present invention provide two way connections. Additionally, as explained in greater detail below, once an administrative program has access to gateways of both systems, the program can modify resources in both systems that do not relate to connectivity, including but not limited to, logging into virtual machines deployed by both systems. Furthermore, while some connectivity solutions are limited to just a VPN connection, aspects of the present invention can be used to configure and troubleshoot various network aspects, including but not limited to, a VPN, firewalls, routing, and/or NAT.

Embodiments of the present invention also can be utilized to connect two systems that are not homogenous. Some existing connection technologies require that the gateways it is connecting work in a homogenous fashion and utilize the same protocol request to establish a communications connection (i.e., a tunnel). Meanwhile, embodiments of the present invention can be utilized to connect two systems or more systems where the systems utilize two or more different syntaxes or protocols. Thus, embodiments of the present invention can be utilized to establish a connection between multiple types of gateways, by using a generic syntax, to configure one or more of a VPN, a firewall, and/or NAT.

FIG. 1 illustrates the complexities of establishing a communications connection between two different computing systems, in this example, a private cloud 110 and a public cloud 120, utilizing existing methods. As is often the case when creating a connection between hybrid computing systems, the private cloud gateway 112 is provided by a first vendor, and the public cloud gateway 122 is provided by a second vendor, so the private cloud gateway 112 and the public cloud gateway 122 do not share a common syntax or configuration protocol, which means that there is no method of communicating (e.g., for the purpose of configuring) with both gateways, simultaneously. Thus, to configure a two-way communications connection 130 between the private cloud gateway 112 and the public cloud gateway 122, engineers and/or administrators of the private cloud 110 and the public cloud 120 exchange gateway information, which includes connectivity information, such as: type of connectivity, certificates, passwords, connection parameters, IP addresses, and/or subnet information. Based on this information, an administrator of the private cloud 110 configures the private cloud gateway 112 and the administrator of the public cloud 120, separately configures the public cloud gateway 122. The connectivity information was exchanged so that the configurations of each gateway matches, enabling communication between the clouds (e.g., computing systems) over a communications connection 130. In addition the configuring the gateways, to establish the connection between the computer systems, administrators on either end must also individually configure their firewalls, routing, and NAT, by first exchanging information in a non-standard format, and later, exchanging trace/bug information if the connection fails.

Utilizing existing methods, recovering from a connection failure is also an involved process. Since there is no standard configuration syntax between the first vendor-provided gateway (e.g., private cloud gateway 112) and the second vendor-provided gateway (e.g., public cloud gateway 122), the initial configurations, which were completed separately, may not match. When this happens, the connection fails. The mismatch could be because of a discrepancy in the parameters. When the connection fails, the computer systems must exchange trace/bug information to repair the connection. Based on this exchange, the administrator of the private cloud 110 re-configures the private cloud gateway 112 and separately, the administrator of the public cloud 120 re-configures the public cloud gateway 122. These separate configuration activities leave room for the type of errors that caused the initial failure to occur again.

Existing methods for establishing hybrid communication connections between different shared computing environments, like FIG. 1, become even more complex, time-consuming, and sensitive to errors, in environments where more than two systems are connected. For example, administrators may wish to establish communication connections to connect a private data center to multiple public clouds. Another example where this existing method is onerous is an enterprise scenario where there are multiple providers for clouds utilized by a company. Forming the connections in these examples requires the coordination of administrators of the individual systems to perform tasks including, but not limited to: 1) exchanging configuration information; 2) establishing communication connections between the systems; 3) debugging the individual connections by exchanging logs; and 4) modifying the configurations of both sides of each connection by exchanging configuration information.

As aforementioned, embodiments of the present invention avoid the back and forth between the administrators or engineers of various computing systems, including cloud computing systems, by enabling configuration of the gateways of the systems by an administrative program, from a single location, and enabling troubleshooting from this location. To this end, the administrative program, in an embodiment of the present invention, utilizes configuration syntax that is independent of the gateway vendors and adds a protocol layer on top of existing connectivity protocol. The administrative program utilizes the layer to make changes related to connectivity and can also make changes to elements of the computer systems that are not related to connectivity.

Figure 2:
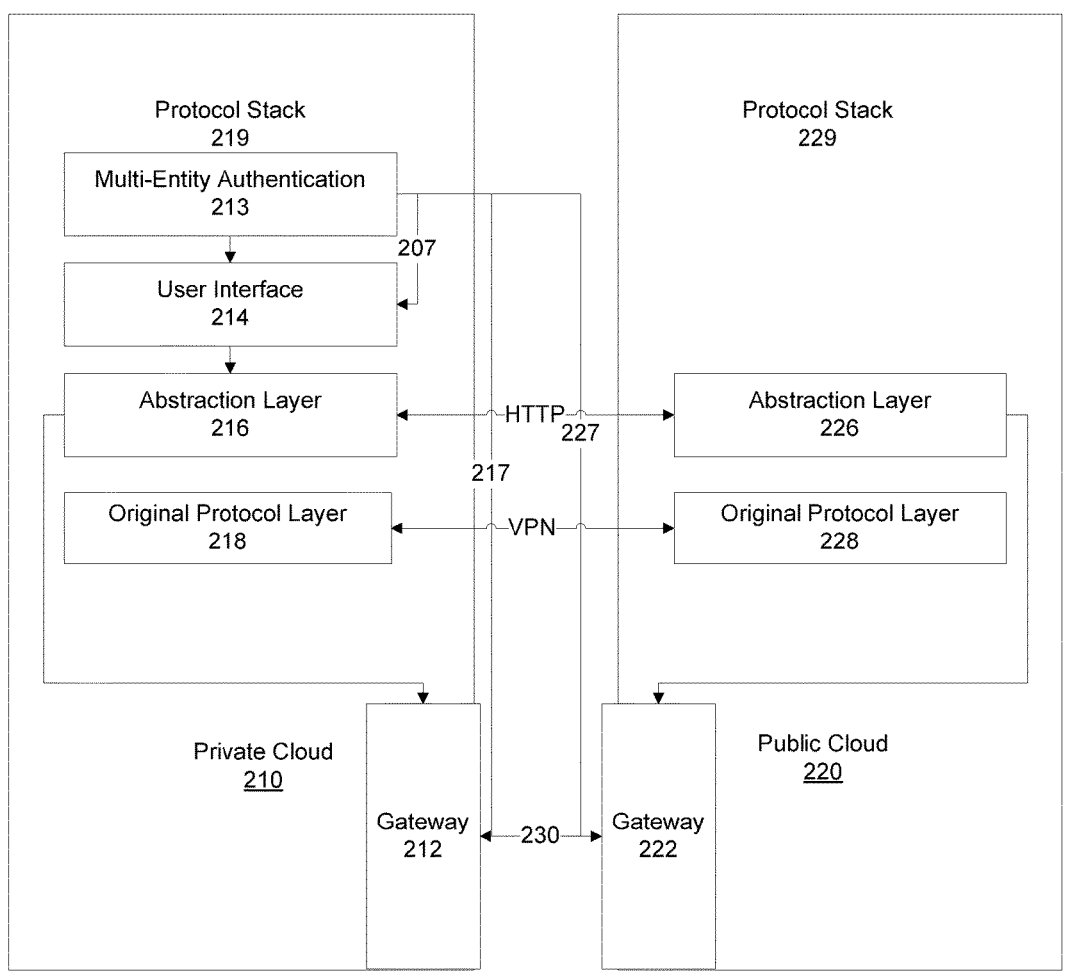
FIG. 2 depicts aspects of a technical environment into which aspects of an embodiment of the present technique can be integrated.
Figure 3:
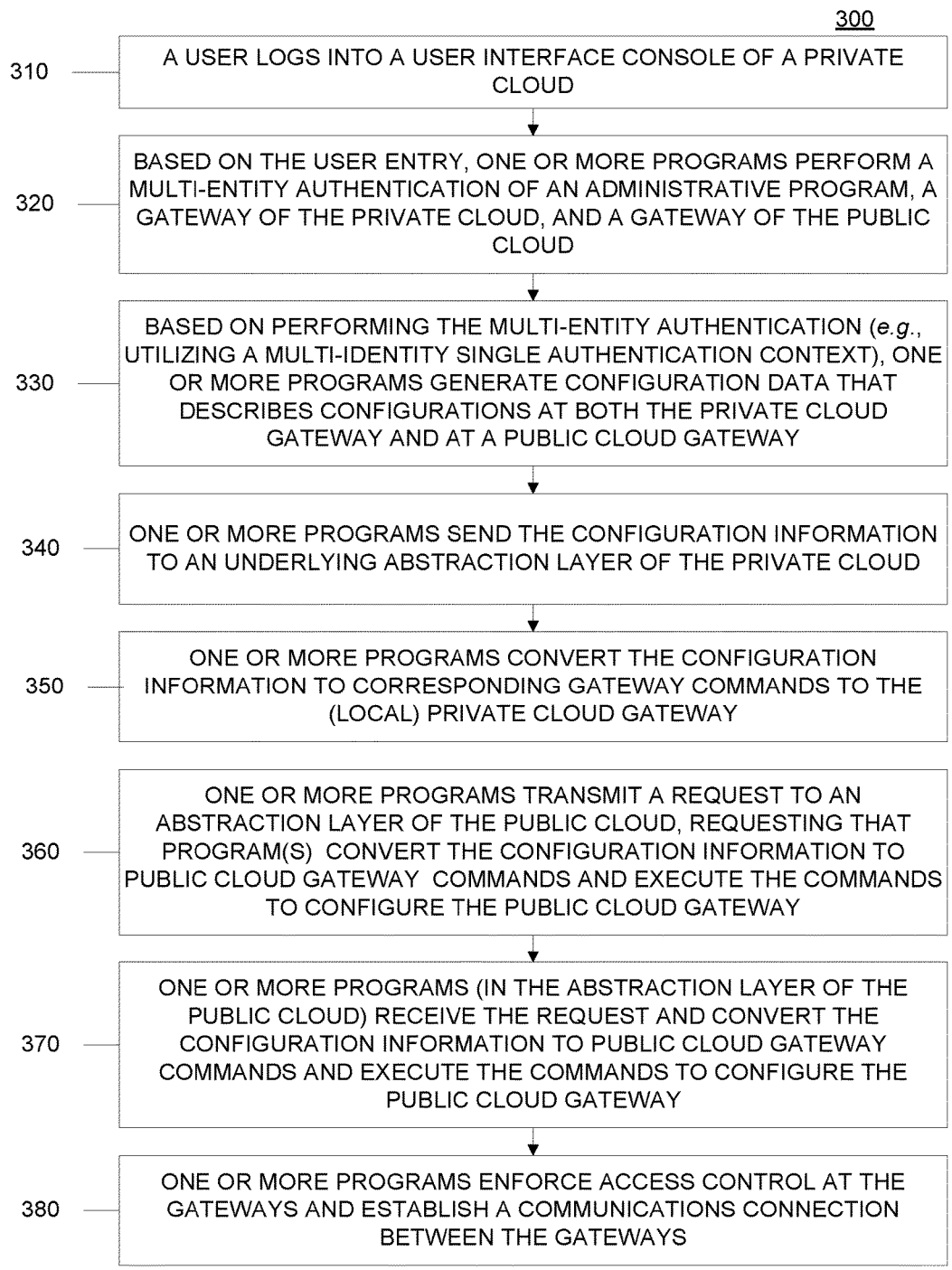
FIG. 3 illustrates certain aspects of some embodiments of the present invention.

FIG. 2 illustrates aspects of an embodiment of the present invention where a private computing system, a private cloud 210, is connected to a public computing system, a public cloud 220. FIG. 3 is a workflow 300 that is used together with the architecture illustration of FIG. 2 to highlight aspects of methods utilized by embodiments of the present invention. FIG. 2 also includes a protocol stack 219 related to the private cloud 210 and a protocol stack 229 related to the public cloud 220, to illustrate aspects of an embodiment of the present invention.

Referring to both FIG. 2 and FIG. 3, in an embodiment of the present invention, to establish a two-way communications connection between the systems, a user logs into a user interface console 214 of the private cloud 210 (310, FIG. 3). Based on the user entry, a program of the user interface console 214 performs a multi-entity authentication 213 (320, FIG. 3). The program authenticates the administrative program (or the equivalent initiating agent, which will later configure elements of the various systems) as well as the two gateways, the private cloud gateway 212, and the public cloud gateway 222. Once the program completes the authentication, the administrative program can access the private cloud gateway 212, and the public cloud gateway 222 using the same authentication data. The functionality of the authentication program and the administrative program are described separately for ease of understanding. As understood by one of skill in the art, the authentication program and the administrative program may be one or more programs executed on one or more processors of one of the computing systems, which, in FIG. 2, is in the private cloud 210.

In an embodiment of the present invention, the three entities involved in the multi-entity authentication 213, the administrative program, the private cloud gateway 212, and the public cloud gateway 222, establish a trust that ultimately allows the administrative program to access the private cloud gateway 212, and the public cloud gateway 222, using the same authentication data. In an embodiment of the present invention, the trust is established by the entities exchanging Diffie-Hellman (D-H) public keys in an incremental fashion.

In a basic D-H scheme, two entities A and B communicate over a public or a private network to generate a shared secret without having to exchange any secrets. The basic algorithm works as follows: using generator g, and modulus prime number p, Entity A generates a private value a, and entity B generates a private value b. Each entity then derives a public D-H value using parameters p and g, together with their respective private values. Entity A's public value is $g^a$ mod p, and Entity B's public value is $g^b$ mod p. Entities A and B then exchange their public values. Entity A, having received $g^b$ mod p from B, computes $(g^b)^a$ mod p; Entity B, having received $g^a$ mod p from A, computes $(g^a)^b$ mod p. The computed values are equal to one another and represent a shared key, which is a secret. When the D-H scheme generalizes to more than two entities, the shared secret key is called a multi-identity single authentication context.

Returning to FIG. 2, in an embodiment of the present invention, the D-H key exchange is adapted to facilitate creation of a multi-identity authentication context for the entities: the administrator, the private cloud gateway 212, and the public cloud gateway 222. To do this, the authentication program initially communicates with each entity over a secure transport channel 207, 217, 227. The transport channels 207, 217, 227 can include, but are not limited to, a data channel secured via Secure Sockets Layer (SSL) or Transport Layer Security (TLS), by a VPN or private network, or the like. The transport channels 207, 217, 227 may be based on any communication protocols that implement the International Organization for Standardization/Open Systems Interconnection (ISO/OSI) Physical and Data Link layers (Layers 1 and 2) upon which a traditional networking stack is built. In this environment, the D-H scheme enables the authentication program to derive a single authentication value, establishing a group of identities by a single construct (referred to initially as single authentication context and a multi-identity single authentication context, when established for one or more entities).

Figure 4:
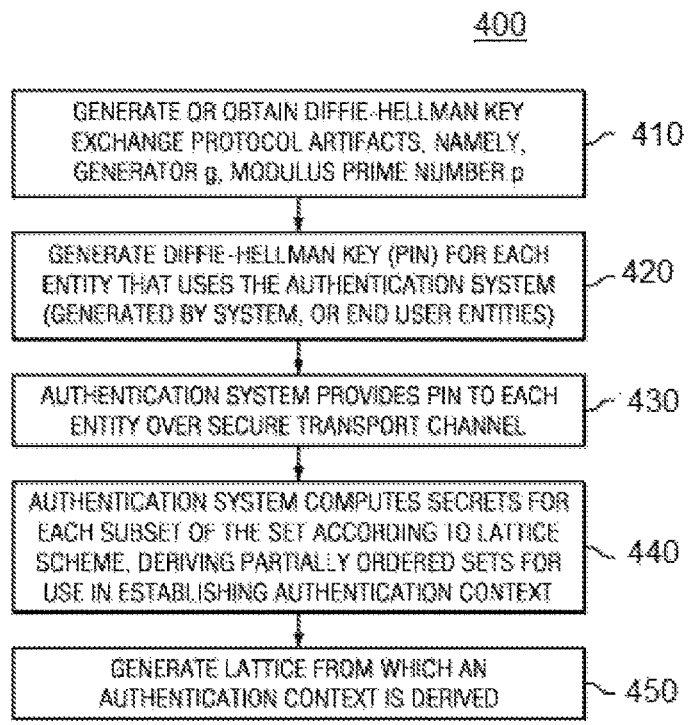
FIG. 4 depicts a workflow illustrating certain aspects of an embodiment of the present invention.

FIG. 4 is a process flow 400 diagram that illustrates how the authentication program generates the multi-identity single authentication context, in an embodiment of the present invention. The authentication program generates D-H artifacts, namely, a generator g, and a modulus p (410). The program can generate these artifacts or receive them from another source that generates them. In an embodiment of the present invention, using the artifacts, the authentication program generates private D-H keys (e.g., personal identification numbers or PINs) for each user (or set of users) (420). Thus, for example, user x may obtain PIN a and user y may obtain PIN b. The authentication program sends the PIN of each user (or entity) to the user, preferably over the secure transport channel (430). The entities receive the PINs, generate private PINs, and provide them to the authentication program. Thus, the authentication program receives the private PINs of the entities (440). The program code may generate and distribute the individual PINs concurrently or sequentially to the entities (e.g., the administrative program to access the private cloud gateway 212 (FIG. 2), and the public cloud gateway 222 (FIG. 2)).

The program code computes cryptographic values to establish the authentication context for the entities (450). For example, the administrative program to access the private cloud gateway 212 (FIG. 2), and the public cloud gateway 222 (FIG. 2) can be understood as a set of three users, such as x, y and z, and each user (or group) has a respective PIN a, b and c (as generated by the program code). Thus, given user set S {x, y, z}, and given their respective PIN numbers a, b and c, the program code calculates the cryptographic values for use in establishing the authentication context (360): $g^a$ mod p for user x (can be used to authenticate single user x), $g^b$ mod p for user y (can be used to authenticate single user y), $g^c$ mod p for user z (can be used to authenticate single user z), $g^{ab}$ mod p (to authenticate users x and y as a single entity (group)), $g^{ac}$ mod p (to authenticate users x and z as a single entity) $g^{bc}$ mod p (to authenticate users y and z as a single entity), and $g^{abc}$ mod p (to authenticate users x, y and z as a single entity). Even a group containing just a single user (e.g., user x with PIN a corresponding to cryptographic value $g^a$ mod p) is authenticated using the same scheme. Unlike traditional D-H (in which the generated secret must remain private), the program code generates a cryptographic value that can become public without creating a security exposure. This is because it is difficult to compute the exponent value for discrete logarithms. Thus, although the program code generates cryptographic values for each subset, these values can become public without risk.

Figure 5:
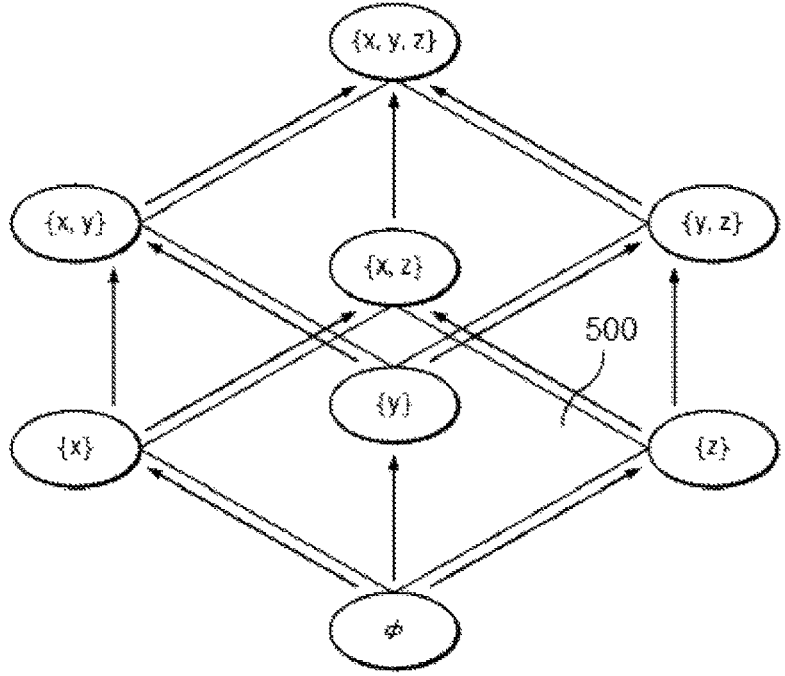
FIG. 5 illustrates certain aspects of some embodiments of the present invention.

Referring to FIG. 5, the cryptographic values generated by the program code and used by the program code to establish the authentication context comprise a lattice 500 (450). A lattice 500 is a mathematical construct that provides a way to formalize the ordering of objects using a concept known as a partially ordered set. A partially ordered set is a set (a finite or infinite set of objects) taken together with a "partial order." Formally, a partially ordered set is defined as an ordered pair P=(X, ≤), where X is a ground set of P and ≤ is the partial order of P. An element j in a partially ordered set said to be an upper bound for a subset S of X if for every s∈S, s≤j. Similarly, a lower bound for a subset S is an element n such that for every s∈S, n≤s. A lattice 500 as an algebra is equivalent to a lattice as a partially ordered set. Certain inequalities hold for any lattice.

In an embodiment of the present invention, the program code generates and maintains (in memory) a representation of the lattice in the form of a data array, a linked list, or some other internal data structure. As illustrated, the lattice 500 is a three dimensional mathematical construct formed by the partially-ordered subsets of set {x, y, z}. This number of users is merely exemplary, although relevant to FIG. 2, and the representative varies accordingly as the number increases or decreases. As used herein, a lattice member corresponds to a user or group of users, and it is represented at a vertex point. Moreover, each lattice member has an associated cryptographic value generated by the program code that is represented by one of the values discussed. The associated cryptographic value for a particular lattice member is sometimes referred to as a password, and, depending on the circumstance, the password may also be the authentication context.

Returning to FIG. 2, in an embodiment of the present invention, by way of exchanging their D-H public keys in an incremental fashion, following the lattice 500 scheme of FIG. 5, an authentication program, in an embodiment of the present invention, authenticates the administrative program and the private cloud gateway 212, by enabling these entities to exchange D-H public keys. Then, the program enables the private gateway 212 to send a combined value of the administrative program key and its own public key, to the public gateway 222. The public gateway 222 utilizes its D-H private key to calculate the aggregate security token and send it back to the administrative program. The administrative program compares the aggregate security token to the pre-registered token representing the three entities. After completing this authentication, the administrative program can access both the private gateway 212 and the public gateway 222, using the same authentication data, i.e., the multi-identity single authentication context.

Returning to FIG. 3, based on performing the multi-entity authentication 213 (FIG. 2) (e.g., utilizing the multi-identity single authentication context), the administration program generates configuration data that describes configurations at both the private cloud gateway 212 (FIG. 2) and at the public cloud gateway 222 (FIG. 2) (330). In an embodiment of the present invention, the configuration data can be described in Extensible Markup Language (XML) or in JavaScript Object Notation (JSON) format and/or as a set of name-value pairs. However, regardless of the format, the configuration data is independent of underlying hardware commands.

In an embodiment of the present invention, a program (e.g., the user interface 214), generates the configuration data for use is establishing a communications connection 230 between the systems, using a common syntax format, as seen in the example below:

```
ConnectionData :
{
"LocalGatewayIP": "1.1.1.1",
"RemoteGatewayIP": "2.2.2.2",
"localsubnets":[10.0.0.0/8],
"remotesubnets":[172.0.0.0/8],
"LocalConnectionParameteres":{ },
"RemoteConnectionParameters":{ },....
}
```

In an embodiment of the present invention, the program code sends the configuration information to an underlying abstraction layer 216 of the private cloud 210 (i.e., the local abstraction layer) (340).

As illustrated in FIG. 2, the abstraction layer 216 overlays an original protocol layer 218 in the private computing system 210. Located remotely from the private computing system 210, is an abstraction layer 226 overlaying an on original protocol layer 228 at the public cloud 220. A program in the abstraction layer 216 of the private cloud 210 can communicate with a program in the abstraction layer 226 of the public computing system, via an Hypertext Transfer Protocol (HTTP) and/or Representational State Transfer Application Programming Interfaces (REST APIs), and vice versa.

Returning to FIG. 3, upon receipt of the configuration information, a program in the abstraction layer 216 of the private cloud 210 converts the configuration information to corresponding gateway commands to configure the local gateway, the private cloud gateway 212 (350). The gateway commands vary in accordance with the vendors who supply the gateway. Thus, commands to configure the private cloud gateway 212 (FIG. 2) and at the public cloud gateway 222 (FIG. 2) would differ because the vendors differ. In an embodiment of the present invention, at this local site, in the abstraction layer invokes a local processing agent which converts from common syntax to specific gateway (brocade) commands, as seen in the example below:

Set vpn ipsec site-to-site peer 1.1.1.1
Set vpn ipsec site-to-site peer 1.1.1.1 local-address 2.2.2.2
Set vpn ipsec site-to-site peer 1.1.1.1 tunnel 1 local-prefix 10.0.0.0/8
Set vpn ipsec site-to-site peer 1.1.1.1 tunnel 1 remote-prefix 172.0.0.0/8
. . .

In an embodiment of the present invention, the program in the abstraction layer 216 of the private cloud 210 transmits a request to a program in the abstraction layer 226 of the remote system, the public cloud 220, to convert the configuration information to its local gateway commands and to execute them to configure the public cloud gateway 222 (360, FIG. 3). By executing this request, a program in the abstraction layer 226 of the public cloud 220, configures the public cloud gateway 222 to match the configuration of the private cloud gateway 212. In an embodiment of the present invention, the program in the abstraction layer 216 of the private cloud 210 makes this configuration request to the remote location, the abstraction layer 226 of the public cloud 220, using HTTP or REST APIs, using the common syntax (as seen in the first example above), together with the authentication data.

Returning to FIG. 3, the program in the abstraction layer 226 (FIG. 2) of the public cloud 220 (FIG. 2) converts configuration information to its local gateway commands and executes them to configure the public cloud gateway 222 (FIG. 2), (FIG. 2) (370). Thus, in an embodiment of the present invention, at this remote site, the program code performs a conversion to specific gateway commands. Below is an example of this conversion:

Crypto map csco2brocade set peer 2.2.2.2
Crypto map csco2brocade match address 111
Crypto map csco2brocade access-list 111 permit ip 10.0.0.0 0.0.0.255 172.0.0.0 0.0.0.255
Crypto map csco2brocade set interface outside # interface with 1.1.1.1

The administrative program (or another program executing on a processor in the now-combined computing environment) enforces access control at the gateways and establishes a communications connection 230 between the gateways (380). In an embodiment of the present invention, the administrative program enforces grained access control such that only resources pertaining to forming the communications connection between the gateways are allowed to communicate over the connection. These resources include, but are not limited to, virtual machines (VMs with network addresses) and/or ports.

In an embodiment of the present invention, the communications connection 230 becomes a resource of the hybrid computing environment 200. In addition to the resources of the private and public cloud, the communications connection is a resource that is utilized to enforce connections between the clouds based on authorization. For example, when access is granted to the connection, the associated VMs (subnets or network addresses and ports specific to those VMs) on either side of the connection (e.g., tunnel) are also granted access. Thus, an administrative program can access resources associated with the connection on either side of the gateway and therefore, can configure firewall rules and NAT rules, to establish and maintain the connection. In an embodiment of the present invention, where multiple connections are established between different computing systems, one connection administrator cannot access resources related to another connection.

In an embodiment of the present invention, program(s) utilize a similar common syntax to generate specific command conversions schemes to create firewall data in a common format, in order to adjust firewall settings. As seen below, program(s) generate firewall data in a common format:

```
FirewallData :
{
"localsubnets":[10.0.0.0/8],
"remotesubnets":[172.0.0.0/8],
"outgoing_ports":{80,443},
"incoming_ports":{22},....
}
```

As illustrated in FIG. 3, the program code passes this data to its local abstraction layer. At the local site, the abstraction layer invokes a program (e.g., a local processing agent) to convert the common syntax to gateway-specific commands. An example of the commands is below.

Set firewall name local2remote rule 1 action accept
Set firewall name local2remote rule 1 destination port 80,443
Set firewall name local2remote rule 1 source address 10.0.0.0/8
Set firewall name local2remote rule 1 destination address 172.0.0.0/8
Set firewall name remote2local rule 1 action accept
Set firewall name remote2local rule 1 destination port 22
Set firewall name remote2local rule 1 destination address 10.0.0.0/8
Set firewall name remote2local rule 1 source address 172.0.0.0/8

The program code then converts the syntax of the common format in order to adjust the firewall settings of the firewall at a remote site. In an embodiment of the present invention, the program code generates a REST API to pass the connection data to the remote site. At the remote site, program code converts the common syntax to specific gateway commands, such as the Linux commands below.

iptables -A INPUT -p tcp --dport 80,443 -j ACCEPT -dest 172.0.0.0/8
iptables -A OUTPUT -p tcp --dport 22 -j ACCEPT -dest 10.0.0.0/8

As discussed earlier, once a communications connection has been established between two computer systems (e.g., two cloud computing systems), a configuration change to an element in one system, including the gateway, may necessitate a change to the other gateway. Program(s) can communicate between these gateways in order to ensure the communications connection between the gateways remains functional when changes are introduced. For example, a secure gateway broker program enables communications between the gateways.

Figure 6:
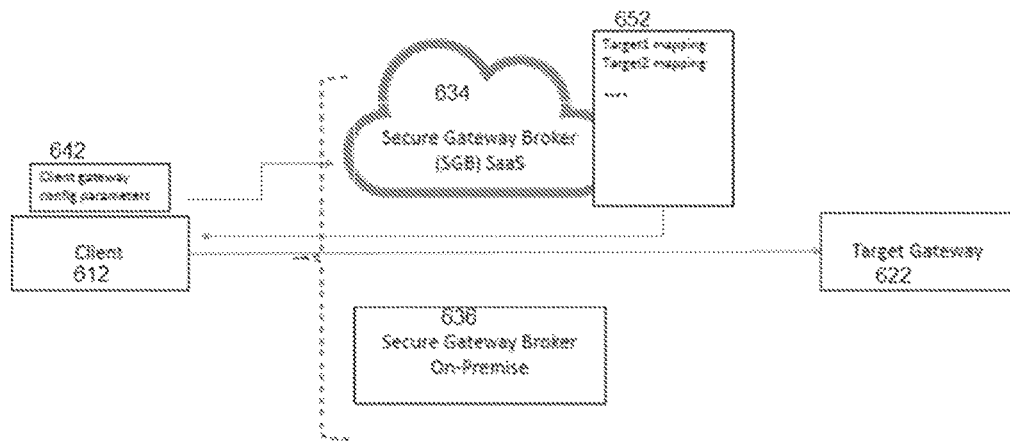
FIG. 6 illustrates certain aspects of some embodiments of the present invention.

FIG. 6 illustrates certain aspects of an embodiment of the present invention and in particular, the establishment of a communications connection (e.g., a tunnel), between two computing systems, for example, when a configuration change is made to one gateway. In an embodiment of the present invention, a secure gateway broker program enables a client from a first computer system, to establish a direct tunnel to a target gateway, of a second computing system. As depicted in this figure, the secure gateway broker program can run on a processing resource on a physical premises 636 or it can run on a resource of a cloud computing system as Software as a Service (SaaS) 634.

As illustrated in FIG. 6 in an embodiment of the present invention, a client 612 program (i.e., a client gateway) communicates its security tunnel parameters 642 to the secure gateway broker 634 636. The secure gateway broker 634 636 translates the security tunnel parameters 642 into a syntax/protocol that is compatible with a target gateway 622 and returns these corresponding configuration parameters 652 to the client 612 for use when tunneling to the target gateway 622. In an embodiment of the present invention, if while attempting to translate the security tunnel parameters 642 into corresponding configuration parameters 652, the secure gateway broker 634 636 determines that there is no one-to-one mapping possible, the secure gateway broker 634 636 provides the client 612 with a recommended specification. A program of the client 612 uses the secure gateway broker program 634 636 response (i.e., corresponding configuration parameters 652 or a recommendation) to establish a direct tunnel to the target gateway 622.

In an embodiment of the present invention, a program executed by a processor(s) of a first computing system, receives configuration instructions in a generic format. The program translates the configuration instructions into a first set of gateway configuration commands, where the first set of gateway configuration commands is in a format compatible with a first gateway of the first computing system. The program executes the first set of gateway configuration commands to configure the first gateway in accordance with the configuration instructions. The program transmits the configuration instructions, via a communication protocol (e.g., a wireless communication protocol and/or a proprietary communication protocol) to a program(s) of a second computing systems. Based on receiving the configuration instructions, the program(s) of the second computing system translate the configuration instructions into a second set of gateway configuration commands, where the second set of gateway configuration commands is in a format compatible with the second gateway. The program(s) of the second computing system executes the second set of gateway configuration commands to configure the second gateway in accordance with the configuration instructions. A program(s) of the first computing system establishes a direct communications connection between the first gateway and the second gateway, based on a configuration of the first gateway matching a configuration of the second gateway.

In an embodiment of the present invention, the program of the first computing system accesses a resource of the second computing system over the direct communications connection. In an embodiment of the present invention, a program accesses, from the second gateway, over the direct communications connection, a resource of the first computing system.

In an embodiment of the present invention, the format of the first set of gateway configuration commands is not compatible with the second gateway. The first gateway may be provided by a first vendor and the second gateway, provided by a second vendor.

In an embodiment of the present invention, at least one of the first computing system or the second computing system is a cloud computing system. The first computing system may be a private cloud and the second computing system may be a public cloud. In an embodiment of the present invention, the program(s) of the second computing system are an abstraction layer of the public cloud (i.e., the second computing system).

In an embodiment of the present invention, the direct communications connection includes a two way tunnel for direct data communication between the first gateway and the second gateway.

In an embodiment of the present invention, configuration instructions include connectivity configuration instructions that include parameters selected from the group consisting of: a type of connectivity for connecting, in data communications, computing resources of the first computing system to computing resources external to the first computing system, authentication information for connecting, in data communications, the computing resources of the first computing system to the computing resources external to the first computing system, Internet Protocol information for connecting, in data communications, the computing resources of the first computing system to the computing resources external to the first computing system, and subnet information for connecting, in data communications, the computing resources of the first computing system to the computing resources external to the first computing system.

In an embodiment of the present invention, the configuration instructions are also selected from the group consisting of: firewall configuration information for connecting to the gateway of the first computing system, the computing resources of the first computing system, and the computing resources external to the first computing system, routing related information for connecting, in data communication, the computing resources of the first computing system to the computing resources external to the first computing system, network address translation information for connecting, in data communication, the computing resources of the first computing system to the computing resources external to the first computing system, and virtual private network related information for connecting, in data communication, the computing resources of the first computing system to the computing resources external to the first computing system.

In an embodiment of the present invention, the programs of the first computing system also transmits, via the communication protocol, the configuration instructions, to a program(s) of a third computing system. Based on receiving the configuration instructions, these program(s) translate the configuration instructions into a third set of gateway configuration commands, where the third set of gateway configuration commands is in a format compatible with the third gateway. The program(s) execute the third set of gateway configuration commands to configure the third gateway in accordance with the configuration instructions. The program of the first computing system then establishes a direct communications connection between at least one of the first gateway and the second gateway to the third gateway, based on a configuration of the third gateway matching the configuration of the first gateway or the configuration of the second gateway.

In an embodiment of the present invention, a program executing on the first computing system receives configuration data from the first gateway indicating a change to the configuration of the first gateway. The program translates the configuration data into the generic format. The program transmits, to the second gateway, over the direct communications connection, the configuration data in the generic format.

In an embodiment of the present invention, a program executing on the first computing system receives over the direct communications connection, configuration data from the second gateway indicating a change to the configuration of the second gateway. The configuration data is in a generic format. The program translates the configuration data into a third set of gateway configuration commands, wherein the third set of gateway configuration commands is in the format compatible with a first gateway of the first computing system. The program executes the third set of gateway configuration commands, to implement the change to the configuration of the second gateway to the configuration of the first gateway.

Figure 8:
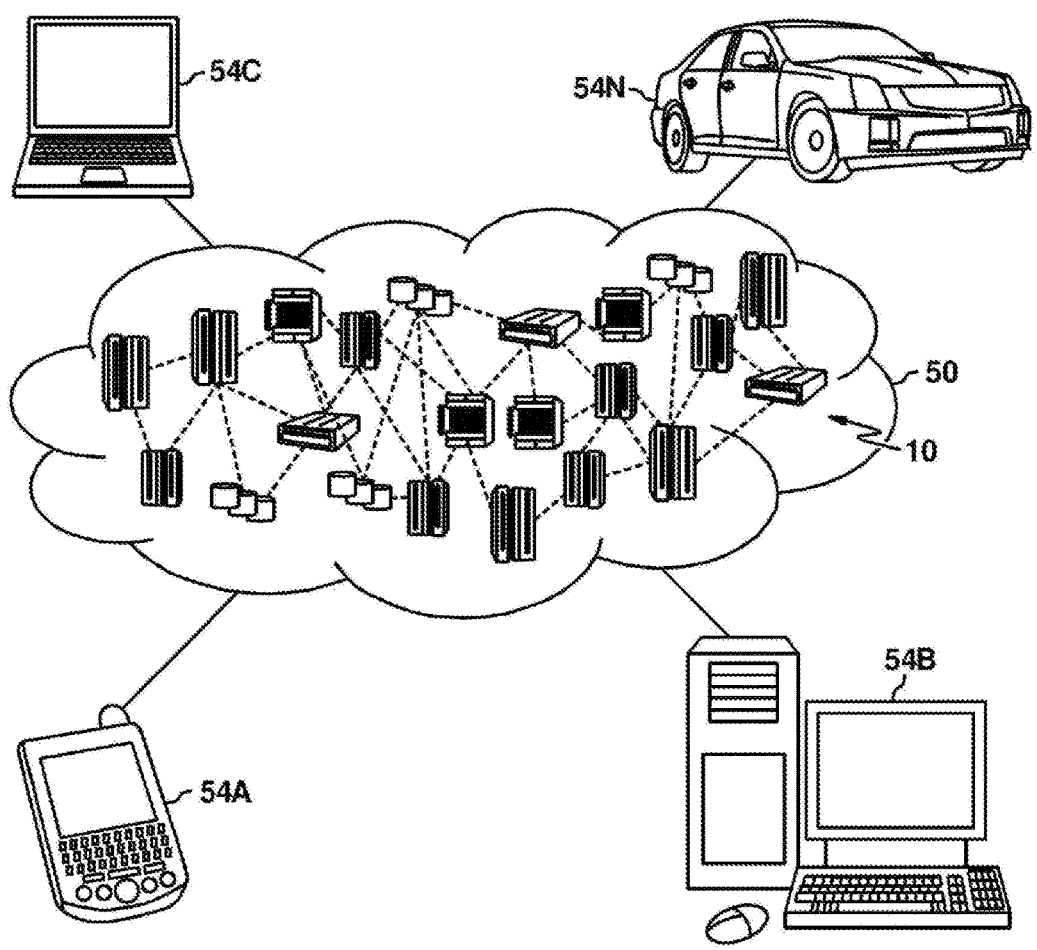
FIG. 8 depicts a cloud computing environment according to an embodiment of the present invention.

Referring now to FIG. 8, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the gateways 212 222 of the computing systems 210 220 can each be understood as cloud computing node 10, and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
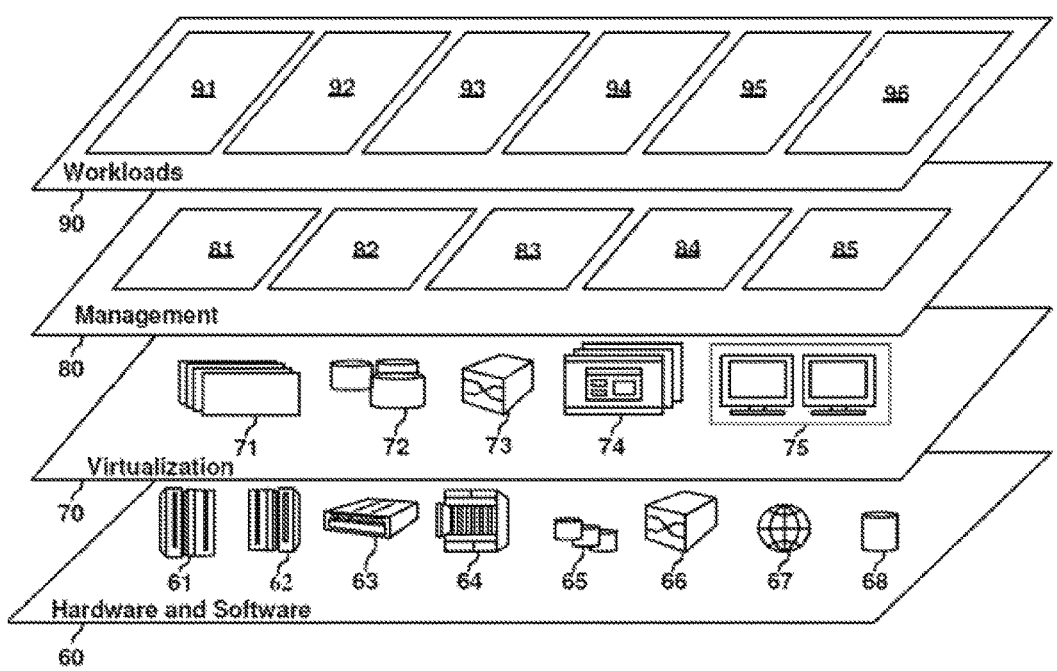
FIG. 9 depicts abstraction model layers according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating configuration information in a common syntax 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
  receiving, by one or more processors of a first computing system, configuration instructions in a generic format;
  translating, by the one or more processors, the configuration instructions into a first set of gateway configuration commands, wherein the first set of gateway configuration commands is in a format compatible with a first gateway of the first computing system;

executing, by the one or more processors, the first set of gateway configuration commands, to configure the first gateway in accordance with the configuration instructions;

transmitting, by the one or more processors, via a communication protocol, the configuration instructions, to one or more programs of a second computing systems, wherein based on receiving the configuration instructions, the one or more programs translate the configuration instructions into a second set of gateway configuration commands, wherein the second set of gateway configuration commands is in a format compatible with the second gateway, and execute the second set of gateway configuration commands to configure the second gateway in accordance with the configuration instructions; and establishing, by the one or more processors, a direct communications connection between the first gateway and the second gateway, based on a configuration of the first gateway matching a configuration of the second gateway.

2. The computer-implemented method of claim 1, further comprising:

accessing, by the one or more processors, over the direct communications connection, a resource of the second computing system.

3. The computer-implemented method of claim 1, further comprising:

accessing, from the second gateway, over the direct communications connection, a resource of the first computing system.

4. The computer-implemented method of claim 1, wherein the format of the first set of gateway configuration commands is not compatible with the second gateway.

5. The computer-implemented method of claim 1, wherein the first gateway is provided by a first vendor and the second gateway is provided by a second vendor.

6. The computer-implemented method of claim 1 wherein at least one of the first computing system or the second computing system comprises a cloud computing system.

7. The computer-implemented method of claim 1, wherein the first computing system comprises a private cloud and the second computing system comprises a public cloud.

8. The computer-implemented of claim 7, wherein the one or more programs of the second computing system comprise an abstraction layer of the public cloud.

9. The computer-implemented of claim 1, the direct communications connection comprising a two way tunnel for direct data communication between the first gateway and the second gateway.

10. The computer-implemented method of claim 1, wherein the configuration instructions comprise connectivity configuration instructions comprising parameters selected from the group consisting of: a type of connectivity for connecting, in data communications, computing resources of the first computing system to computing resources external to the first computing system, authentication information for connecting, in data communications, the computing resources of the first computing system to the computing resources external to the first computing system, Internet Protocol information for connecting, in data communications, the computing resources of the first computing system to the computing resources external to the first computing system, and subnet information for connecting, in data communications, the computing resources of the first computing system to the computing resources external to the first computing system.

11. The computer-implemented method of claim 9, wherein the configuration instructions are further selected from the group consisting of: firewall configuration information for connecting to the gateway of the first computing system, the computing resources of the first computing system, and the computing resources external to the first computing system, routing related information for connecting, in data communication, the computing resources of the first computing system to the computing resources external to the first computing system, network address translation information for connecting, in data communication, the computing resources of the first computing system to the computing resources external to the first computing system, and virtual private network related information for connecting, in data communication, the computing resources of the first computing system to the computing resources external to the first computing system.

12. The computer-implemented method of claim 1, further comprising:

transmitting, by the one or more processors, via the communication protocol, the configuration instructions, to one or more programs of a third computing system, wherein based on receiving the configuration instructions, the one or more programs translate the configuration instructions into a third set of gateway configuration commands, wherein the third set of gateway configuration commands is in a format compatible with the third gateway, and execute the third set of gateway configuration commands to configure the third gateway in accordance with the configuration instructions; and establishing, by the one or more processors, a direct communications connection between at least one of the first gateway and the second gateway to the third gateway, based on a configuration of the third gateway matching the configuration of the first gateway or the configuration of the second gateway.

13. The computer-implemented method of claim 1, further comprising:

receiving, by one or more processors, configuration data from the first gateway indicating a change to the configuration of the first gateway;

translating, by the one or more processors, the configuration data into the generic format; and transmitting, by the one or more processors, to the second gateway, over the direct communications connection, the configuration data in the generic format.

14. The computer-implemented method of claim 1, further comprising:

receiving, by one or more processors, over the direct communications connection, configuration data from the second gateway indicating a change to the configuration of the second gateway, wherein the configuration data is in a generic format;

translating, by the one or more processors, the configuration data into a third set of gateway configuration commands, wherein the third set of gateway configuration commands is in the format compatible with a first gateway of the first computing system; and executing, by the one or more processors, the third set of gateway configuration commands, to implement the change to the configuration of the second gateway to the configuration of the first gateway.

15. The computer-implemented method of claim 1, wherein the communication protocol is selected from the group consisting of: a wireless communication protocol, a proprietary communication protocol.

16. A computer program product comprising:
a computer readable storage medium readable by one or more processors and storing instructions for execution by the one or more processors for performing a method comprising:
receiving, by one or more processors of a first computing system, configuration instructions in a generic format;
translating, by the one or more processors, the configuration instructions into a first set of gateway configuration commands, wherein the first set of gateway configuration commands is in a format compatible with a first gateway of the first computing system;
executing, by the one or more processors, the first set of gateway configuration commands, to configure the first gateway in accordance with the configuration instructions;
transmitting, by the one or more processors, via a communication protocol, the configuration instructions, to one or more programs of a second computing systems, wherein based on receiving the configuration instructions, the one or more programs translate the configuration instructions into a second set of gateway configuration commands, wherein the second set of gateway configuration commands is in a format compatible with the second gateway, and execute the second set of gateway configuration commands to configure the second gateway in accordance with the configuration instructions; and
establishing, by the one or more processors, a direct communications connection between the first gateway and the second gateway, based on a configuration of the first gateway matching a configuration of the second gateway.

17. The computer program product of claim 16, the method further comprising:
accessing, by the one or more processors, over the direct communications connection, a resource of the second computing system.

18. The computer program product of claim 16, the method further comprising:
accessing, from the second gateway, over the direct communications connection, a resource of the first computing system.

19. The computer program product of claim 16, wherein the format of the first set of gateway configuration commands is not compatible with the second gateway.

20. A device comprising:
a memory;
one or more processors in communication with the memory;
program instructions executable by the one or more processors via the memory to perform a method, the method comprising:
receiving, by one or more processors of a first computing system, configuration instructions in a generic format;
translating, by the one or more processors, the configuration instructions into a first set of gateway configuration commands, wherein the first set of gateway configuration commands is in a format compatible with a first gateway of the first computing system;
executing, by the one or more processors, the first set of gateway configuration commands, to configure the first gateway in accordance with the configuration instructions;
transmitting, by the one or more processors, via a communication protocol, the configuration instructions, to one or more programs of a second computing systems, wherein based on receiving the configuration instructions, the one or more programs translate the configuration instructions into a second set of gateway configuration commands, wherein the second set of gateway configuration commands is in a format compatible with the second gateway, and execute the second set of gateway configuration commands to configure the second gateway in accordance with the configuration instructions; and
establishing, by the one or more processors, a direct communications connection between the first gateway and the second gateway, based on a configuration of the first gateway matching a configuration of the second gateway.

* * * * *